(12) United States Patent
Cowle et al.

(10) Patent No.: US 6,441,953 B1
(45) Date of Patent: Aug. 27, 2002

(54) L BAND MULTISTAGE AMPLIFIER WITH IMPROVED NOISE FIGURE

(75) Inventors: Gregory J. Cowle, Painted Post, NY (US); Felton A. Flood, Somerset; Chia Chi Wang, Hillsborough, both of NJ (US); Luis A. Zenteno, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/556,355

(22) Filed: Apr. 24, 2000

(51) Int. Cl.⁷ .................................................. H01S 3/00
(52) U.S. Cl. ............................... 359/341.3; 359/337.4
(58) Field of Search .............................. 359/337, 341, 359/341.31, 341.33; 372/4, 6

(56) References Cited

U.S. PATENT DOCUMENTS

| | | | | |
|---|---|---|---|---|
| 5,838,487 A | * | 11/1998 | Nilsson et al. | 359/341 |
| 6,049,417 A | * | 4/2000 | Srivastava et al. | 359/341 |
| 6,049,418 A | * | 4/2000 | Srivastava et al. | 359/341 |
| 6,104,527 A | * | 8/2000 | Yang | 359/341 |
| 6,141,142 A | * | 10/2000 | Espindola et al. | 359/341 |
| 6,201,637 B1 | * | 3/2001 | Nilsson et al. | 359/341 |
| 6,215,584 B1 | * | 4/2001 | Yang et al. | 359/341 |

FOREIGN PATENT DOCUMENTS

| | | | | |
|---|---|---|---|---|
| FR | WO-00/49686 | * | 8/2000 | H01S/3/06 |
| GB | 2331621 A | * | 5/1999 | H01S/10/17 |
| WO | WO-00/24094 | * | 4/2000 | H01S/3/067 |

OTHER PUBLICATIONS

Sun et al., "An 80nm Ultra wide band EDFA with Low Noise figure and High Output Power", IOOC_ECOC. Optical Fibre Communication, vol. 5, Jan. 1997, pp. 69–72.*

Massicott et al., "Low Noise Operation of ER3+ Doped Silica Fibre Amplifier around 1.6 um", Electronics Letters, vol. 28, No. 20, Sep. 1992, pp. 1924–1925.*

Espindola, R.P. Low Noise, High Gain, High Conversion Efficiency L–band EDFA, OSA Trends in Optics and Photonics in Optical Amplifiers and their Applications. Jun. 9–11, 1999. vol. 30. pp. 132–135.

Dejneka, M. et al., "Tapered Fiber Laser", application Ser. No. 09/378,770, filed on Aug. 20, 1999.

Massicott, J.F., et al., "High Gain, Broadband, 1.6$\mu$m $Er^{3+}$ Doped Silica Fibre Amplifier", Electronic Letters (1990), vol. 26, p. 1645.

Massicott, J.F., et al., "Low Noise Operation of $Er^{3+}$ Doped Silica Fibre Amplifier around 1.6$\mu$m", Electronic Letters (1992), vol. 28, p. 1924.

Desurvive, E., "Erbium–Doped Fiber Amplifiers Principles and Applications", John Wiley & Son, Inc., Chapter 6.

* cited by examiner

*Primary Examiner*—Thomas H. Tarcza
*Assistant Examiner*—Deandra M. Hughes
(74) *Attorney, Agent, or Firm*—Svetlana Short

(57) ABSTRACT

A multi-stage optical fiber amplifier comprises a first gain stage amplifying and optical signal; a pumping source coupled to the first gain stage, a second gain stage coupled to the first gain to further amplifying the optical signal to a desired output signal power, and a second pumping source coupled to the second gain stage. The second pumping source is preferably an erbium-doped fiber laser and has an operating wavelength between about 1520 nm and about 1620 nm. This amplifier achieves good noise figure and high output powers.

20 Claims, 2 Drawing Sheets

L BAND MULTISTAGE AMPLIFIER WITH IMPROVED NOISE FIGURE

FIELD OF THE INVENTION

The present invention relates in general to multi-stage optical amplifiers. More particularly, the present invention relates to a multi-stage erbium-doped fiber optical amplifiers having high output power and low noise.

BACKGROUND OF THE INVENTION

One technique used to increase the capacity of a fiber optic communication systems is wavelength division multiplexing (WDM). In a WDM system, the total signal output power of an optical amplifier generally increases with the number of total channel counts. Use of an extended wavelength band sometimes referred to as the L-band (approximately 1565 nm to approximately 1620 nm) is also being implemented to further increase channel total counts. As a result, there is a renewed need for higher power, L-band optical fiber amplifiers, such as high-power erbium-doped fiber amplifiers (EDFAs) with a good performance. EDFAs have to a large extent replaced the current optoelectronics regenerators in many optical long haul terrestrial and undersea lightwave communications systems. EDFAs may be used as power amplifiers to boost transmitter power; as preamplifiers to increase the signal amplitude received by the receiver; and as in-line repeaters to periodically boost the signal to a level sufficient to traverse long span distances.

Optical fiber amplifiers are designed by considering a number of parameters including gain, output power, and noise performance. Noise performance is typically measured by the noise figure (NF) which is defined as the signal-to-noise ratio at the input of the optical amplifier divided by that at the output. The noise figure NF is measured in dB. When optical fiber amplifiers are used as repeaters, it is desirable that these operate with a very low noise figure and a high output power in order to maximize the distance between adjacent repeaters in the lightwave system. High output is also required where repeaters are used in systems employing multiple multiplexed channels.

Optical fiber amplifiers often have multiple gain or amplification stages; for example an input stage and a power stage. Typically, pump lasers providing light in wavelength bands centered about 980 nm and 1480 nm are used to pump both the input stage and the power stage. However, the power stage typically requires significant pump power to amplify the signals, and it is technically challenging and costly to implement single-transverse-mode laser sources at sufficient power at these low wavelengths. As a result, the power stage of a high power optical fiber amplifier is often very complex in order to accommodate multiple pump sources and to provide the desired high signal output powers. Accordingly, a need exists for an optical fiber amplifier that has a less complex and less expensive power stage.

SUMMARY OF THE INVENTION

The present invention is directed to a multi-stage optical fiber amplifier that includes: a first gain stage having an input port and amplifying an optical signal; a pump source coupled to the first gain stage; and a second gain stage coupled to the first gain stage. the second gain stage further amplifies the optical signal to a desired output signal power. A second pumping source is coupled to the second gain stage. The second pump source is an optical medium doped with a rare earth element.

According to one embodiment of the present invention, the second pumping source is a fiber laser that comprises a rare earth element, such as erbium or thulium, and has an operating wavelength between about 1520 nm and about 1620 nm. Preferably, the operating wavelength is about 1535 nm.

According to an embodiment of the present invention, the second pumping source comprises at least one light source having a wavelength between about 1500 nm and about a wavelength that is 1 nm shorter than the shortest wavelength of the output signal.

According to one embodiment of the present invention, a multi-stage erbium optical amplifier comprises a first stage that is pumped by a first light source capable of producing an inversion of at least 0.6 at one of the ends of the first stage, and a second stage that is pumped by a second light source in which the inversion is substantially reduced at the second stage so that gain at the extended band (or L-band of an EDFA) is produced.

It is an advantage of the multi-stage optical fiber amplifier of the present invention that it utilizes a relatively inexpensive and simple power stage. It is another advantage of the present invention that less power is required to operate the pump coupled to the power stage of the optical fiber amplifier. The foregoing and other aspects of the present invention will become apparent from the following detailed description of the invention when considered in conjunction with the accompanying drawings.

DESCRIPTION OF EXEMPLARY EMBODIMENT

The illustrative embodiments of the present invention are long band (L-band), erbium-doped fiber amplifiers (EDFAs) that achieve good noise figure (NF) (i.e., low noise, below about 6.5 dB) and high output power (i.e., at least about 19 dBm).

Figure 1:
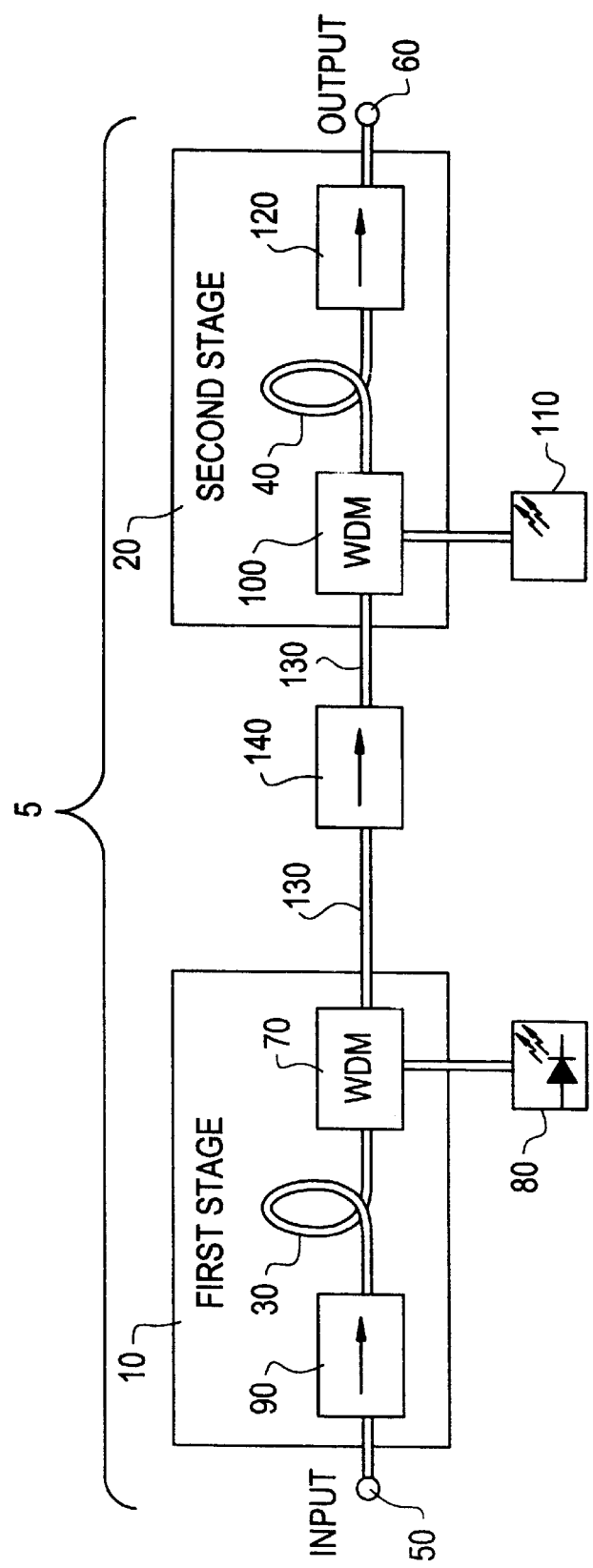
FIG. 1 is a block diagram of an exemplary multi-stage optical fiber amplifier in accordance with the present invention.

FIG. 1 shows a block diagram of an illustrative arrangement of elements forming an exemplary L-band multi-stage optical amplifier 5 embodying the principles of the invention. The optical amplifier 5 has two stages 10 and 20 comprising erbium-doped fibers 30 and 40, respectively. The first and second length of erbium-doped fiber 30 is operatively coupled to the input/output port 50 of the optical amplifier 5. The second erbium-doped fiber 40 is operatively coupled to the output 60 of the optical amplifier. It should be noted that although the exemplary discussion herein is directed to erbium as the rare earth element fiber laser, other rare earth elements such as thulium can be used as dopants.

In the first stage 10 (also referred to herein as the input stage), a wavelength division multiplexer (WDM) 70 permits the introduction of light from a pump source 80 to couple with respect to a signal which is presented at the input port 50 of the first stage 10. An optical isolator 90 is optionally positioned between the input put 50 of the first stage 10 and the erbium-doped fiber 30 to suppress back reflections. Erbium-doped fibers, WDMs, and optical isolators and their functions employed therein are well known in the art; therefore, details are not presented here. The pump source 80 is preferably a laser diode at one of any number of wavelengths in the pump bands, centered for example, at 980 nm and/or 1480 nm (it should be noted that it is possible to have the input stage 10 pumped by both 980 nm and 1480 nm) pump sources. More preferably, the first stage 10 is backward pumped with a 980 nm laser diode. The pump source 80 should be sufficient to produce a locally high inversion (e.g., at least about 0.6) at the front end of the input stage just after the pump is injected, if the amplifier is forward pumped, for example.

The second stage 20 (i.e., the power stage) comprises a WDM 100 that couples pump light from a pump source 110 into the erbium-doped fiber 40. The signal carrying wavelengths that exit the first amplifying erbium-doped fiber 30 are coupled into the second erbium-doped fiber 40 of the second stage 20. This stage 20 provides additional signal gain without additional significant degradation in noise. The pump source 110 is preferably a single-transverse-mode light source such as a laser diode or a fiber laser, for example. An optical isolator 120 is positioned between the erbium-doped fiber 40 and the output port 60 of the second stage 20 to suppress oscillations and noise figure penalties associated with back reflections. As will be appreciated by those skilled in the art, the length of erbium-doped fiber 40 may be configured so that with strong pumping, substantial gain and output power may be realized by the optical fiber amplifier. Preferably, the pump source 110 is sufficient to reduce or limit the inversion both locally and along the length of the optical fiber amplifier 5 to a level where gain only in L-band is strongly favored. It should be noted that a high inversion can also provide significant gain to L-band, but it is not "flat" spectrally in L-band, which is the reason low inversion for L-band is preferred. It is preferred that the second pump source 110 provides light in wavelength range from about 1500 nm to a wavelength that is 1 nm and preferably 20 nm shorter than the shortest wavelength of the output signal of the optical fiber amplifier.

The first stage 10 and the second stage 20 are coupled with a coupling fiber 130 so that the amplified signal output from the first stage 10 is presented to the input of the second stage 20. An isolator 140 is positioned in the fiber 130 to ensure that backward-propagating signal from the second stage 20 does not reach the first stage 10 because this would result in a decrease in inversion at the first stage 10 and cause degradation of the noise figure.

Preferably, the second stage 20 is a single-coil power stage having a pump source 110 with a wavelength between 1520 and 1620 nm. More preferably, the pump source 110 is a 1520–1620 nm fiber laser. Preferably, the pump source 110 is 1535 nm fiber laser. The pump power for pump source 110 of the power stage is preferably about 400 mW, which yields a total signal output power of at least about 19 dBm, and more preferably at least about 23 dBm or more. By using a high-power fiber laser to support a high power L-band EDFA, the power stage 20 is simplified (e.g., a single erbium coil) and the manufacturing yield is improved. In one example, with a power stage 20 pumped by 400 mW 1535-nm pump source, the exemplary L-band EDFA produces a total output power of about 23 dBm. Because the input stage 10 has a pump wavelength of 980 nm and a pump power of about 160 mW, the overall amplifier noise figure is low (the worst channel NF is 6.5 dB).

Preferably, pump sources 110 include a 1535-nm Er tapered fiber laser with a 40×15 $\mu m^2$ multimode core, or an Er double-clad fiber laser with the first cladding of the same dimensions. These pump sources have a lasing threshold of about 140 mW. Thus, one would expect more than 650 mW of output power at 1535 nm, assuming a 2 W pumping of the input stage 10 with a broad area 980 nm semiconductor laser, 50% coupling efficiency, and 80% slope efficiency.

The exemplary amplifiers of the present invention have high input and high output powers, as well as good NF for the high input power conditions. It is preferable that these amplifiers have a 980 nm and/or 1480 nm pumped input stage and an erbium fiber laser pumped power stage in order to achieve both good NF and high output powers in an L-band optical amplifier.

It is preferable to use an auxiliary signal control and/or optical gain control to control the transients of the optical amplifier. These transient control methods are described in Desurvire, Erbium-Doped Fiber Amplifiers Principles And Applications, John Wiley & Son, Inc., Chapter 6, and incorporated herein by reference. If pump control is used for transient control of the optical amplifier of the present invention, it is preferable that the power of the fiber laser(s) is not changed and the pump control is performed by controlling other pump sources having fewer severe relaxation oscillations. It is also preferable to insert a light intensity modulator between the fiber laser and the second amplifier to adjust the pump power delivered to the second amplifier for pump control

EXAMPLE 1

In a first exemplary embodiment of an amplifier in accordance with the present invention, the first stage 10 is forward pumped with a 980 nm pump source at a pump power of about 160 mW. The second stage 20 is forward pumped with a 1535 nm pump source (e.g., a commercially available fiber laser) at a pump power of about 350 mW. This configuration provides a total output power of about 24 dBm.

In the first exemplary embodiment, the input signal power is about +4 dBm, or −12 dBm per channel for a total of 40 channels distributed from about 1570.4 nm to about 1601.6 nm with a 0.8-nm channel spacing. The front end, the mid-stage, and the output end losses are about 1.6 dB, 1.3 dB, and 0.9 dB, respectively.

It should be noted that to support a 24 dBm signal output power with a pump wavelength of 980 nm, as in prior art, a pumping power of about 550 mW is needed. Such a high power is difficult to obtain with single-transverse-mode 980 nm laser sources. Moreover, to support a 24 dBm signal output power with a pump wavelength of 1480 nm, as is prior art, a pumping power of about 365 mW is needed. Thus, to obtain 1480 nm single-transverse-mode sources at this power two to three laser diodes need to be multiplexed. This is very expensive and complex.

It should be noted that even if the pump wavelength of the second stage 20 is larger than 1535 nm, a substantially similar output spectrum is obtained. The second stage 20 utilizes a higher pumping power. It should be noted that is it easier to have a high power erbium-based fiber laser at 1565 nm, because of the lower pumping threshold of the 1565 nm laser. This implies that the power stage 20 of an L-band amplifier can be pumped with a wavelength very close to the shortest signal wavelength.

There is a concern about the NF for pumping an amplifier with a wavelength close to the signals because the inversion could be low and the NF could be high. For pumping with 1535 nm to 1565 nm wavelength pumps, the worst case NF is below 6.0 dB, which is comparable to the NF obtained with the prior art at either 980 nm or 1480 nm and is sufficient for most applications.

EXAMPLE 2

In a second exemplary embodiment of an amplifier of the present invention, the first stage 10 is forward pumped with a 980 nm light source at a pump power of about 160 mW, as in the first exemplary embodiment. The second stage 20 is forward pumped with a 1535 nm pump source at a pump power of about 400 mW which was obtained by amplifying a 10 dBm distributed-feedback laser diode. This configuration provides a total output power of about 23 dBm.

Figure 2:
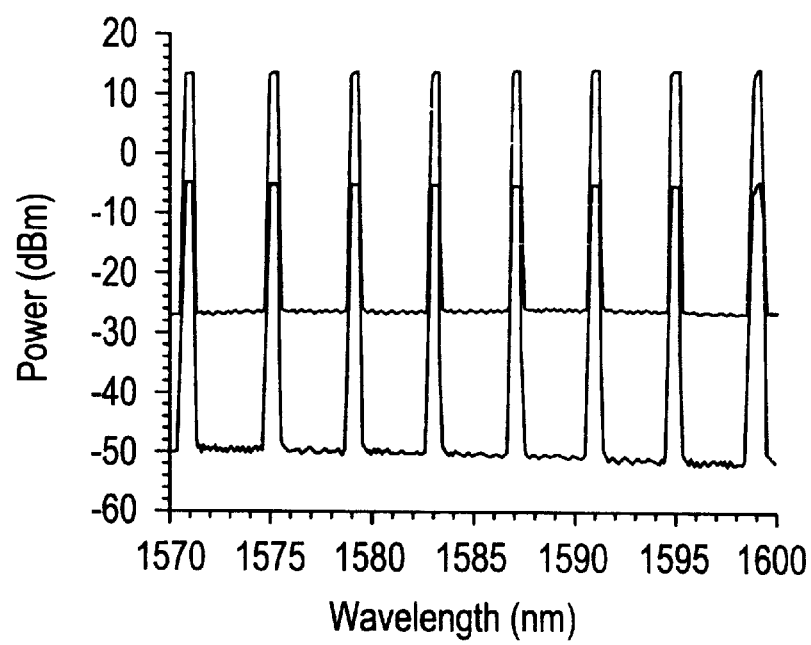
FIG. 2 is a graph of the input and output spectra of an exemplary amplifier having a 1535 nm pumped power stage in accordance with the present invention.

There were a total of eight signals with wavelengths evenly distributed from about 1571 nm to about 1599 nm. The total signal input power was about +4 dBm. The input and output spectra are shown in FIG. 2 with the output spectrum having higher power levels. The resolution of the optical spectrum analyzer for these measurements was 0.5 nm. There was virtually no measurable remnant pump power at 1535 nm, as expected.

Figure 3:
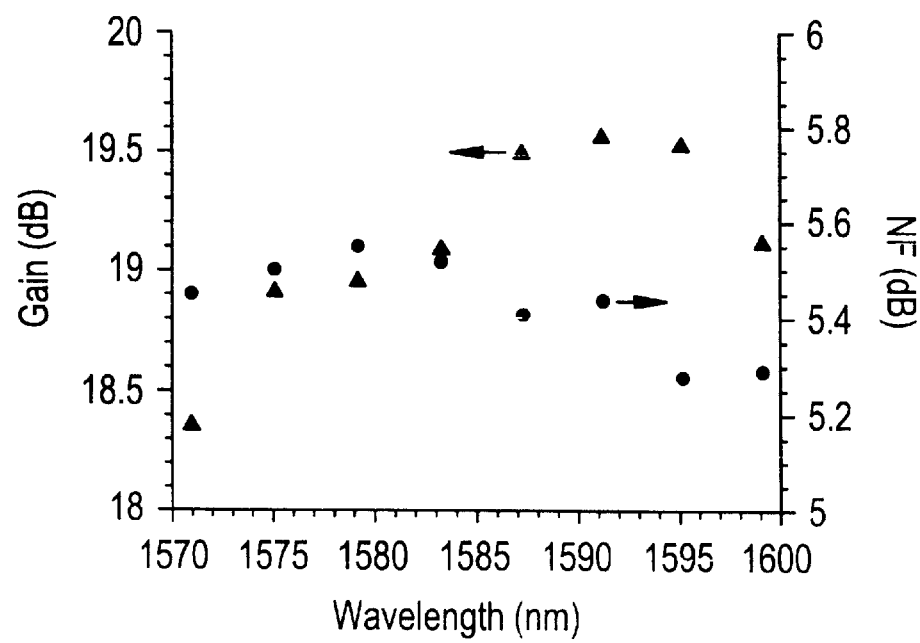
FIG. 3 is a graph of the gain and noise figure spectra derived from the spectra of FIG. 2.

The gain and the NF spectra can be derived from the input and output spectra and is shown in FIG. 3. It can be seen that the average gain is about 19 dB, consistent with the total signal output power measured with a power meter. The worst channel NF is less than about 6.5 dB.

It should be noted that backward pumping is used in the system of FIG. 1, whereas FIGS. 2 and 3 were obtained using embodiments that were forward pumped. The present invention can be used either with backward pumping or with forward pumping.

Thus, the present invention increases the capacity of an EDFA-based WDM system by using the extended band or L-band of an EDFA with channel wavelengths from about 1565 nm to about 1620 nm. The erbium-based fiber lasers are suited as the pump source of L-band EDFAs. The present invention is directed to pumping the power stage 20 of an L-band EDFA with fiber lasers. The power stage thus can be as simple as a single coil to reduce the cost and improve the manufacturing yield. Even as the power, stage 20 of an L-band EDFA is pumped with wavelengths very close to the signals, the NF of such an amplifier is still good.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed:

1. A multi-stage optical fiber amplifier comprising:
   (i) a first gain stage having an input port, the first gain stage amplifying an optical signal;
   (ii) a first pump source coupled to the first gain stage;
   (iii) a second gain stage coupled to the first gain stage, the second gain stage further amplifying the optical signal provided by the first gain stage to a desired output signal power; and
   (iv) a second pump source coupled to the second gain stage, wherein said second pump source includes an optical medium doped with a rare earth element.

2. The optical fiber amplifier according to claim 1, wherein the rare earth element is one of erbium and thulium.

3. The multi-stage optical fiber amplifier according to claim 1, wherein the second pump source has an operating wavelength between 1520 nm and 1620 nm.

4. A multi-stage optical fiber amplifier comprising:
   (i) a first gain stage having an input port, the first gain stage amplifying an optical signal;
   (ii) a first pump source coupled to the first gain stage;
   (iii) a second gain stage coupled to the first gain stage, the second gain stage further amplifying the optical signal provided by the first gain stage to a desired output signal power; and
   (iv) a second pump source coupled to the second gain stage, wherein said second pump source includes an optical medium doped with a rare earth element and the operating wavelength of said second pump source is about 1535 nm.

5. The multi-stage optical fiber amplifier according to claim 1, wherein the first gain stage comprises a first isolator and the second gain stage comprises a second isolator.

6. The multi-stage optical fiber amplifier according to claim 1, wherein the first gain stage comprises at least one of a 980 nm light source and a 1480 nm light source.

7. The multi-stage optical fiber amplifier according to claim 1, wherein said output signal power is at least about 23 dBm.

8. The multi-stage optical fiber amplifier according to claim 1, wherein said optical fiber amplifier provides output signal in a wavelength range between about 1565 nm and about 1620 nm.

9. The multi-stage optical fiber amplifier according to claim 1, wherein said second pump provides a pumping which is at least about 20 nm shorter than the wavelength of the output signal of the optical amplifier.

10. The multi-stage optical fiber amplifier according to claim 1, wherein the second pump source comprises at least one light source having a wavelength in the range between about 1500 nm and 1 nm shorter than the shortest wavelength of the output signal of the amplifier.

11. A multi-stage optical fiber amplifier comprising:
    (i) a first gain stage having an input and an output for amplifying an optical signal;
    (ii) a pump source coupled to the first gain stage;
    (iii) a second gain stage coupled to the first gain stage and having an input and an output to further amplify the optical signal to a desired output signal power; and
    (iv) a second pump source having an operating wavelength larger than 1480 nm and between 1520 nm and 1620 nm, said second pump source being coupled to the second gain stage, wherein the pump source is a rare earth element fiber laser.

12. The multi-stage optical fiber amplifier according to claim 11, wherein the first pump source comprises a laser diode having an operating wavelength of at least one of 980 nm and 1480 nm.

13. The multi-stage optical fiber amplifier according to claim 11, wherein the output signal of the amplifier has a wavelength range between about 1565 nm and about 1620 nm.

14. The multi-stage optical fiber amplifier according to claim 11, wherein the wavelength is at least about 20 nm shorter than the wavelength of the output signal of the amplifier.

15. A multi-stage erbium doped optical amplifier in which a first stage is pumped by a first light source capable of producing an inversion of at least 0.6 at one of the ends of the first stage, and a second stage is pumped by a second light source in which the inversion is substantially reduced at the second stage so that gain is produced at the extended band, wherein said second light source includes a rare earth doped laser and operates at a wavelength between 1520 nm and 1620 nm.

16. A multi-stage erbium doped optical amplifier in which a first stage is pumped by a first light source capable of producing an inversion of at least 0.6 at one of the ends of the first stage, and a second stage is pumped by a second light source in which the inversion is substantially reduced at the second stage so that gain is produced at the extended band, wherein said second light source operates at a wavelength between 1520 nm and 1620 nm, wherein the first light source comprises a laser diode having an operating wavelength at least one of a 980 nm and 1480 nm, and the second light source comprises a rare earth element fiber laser.

17. The multi-stage optical fiber amplifier according to claim 15 wherein the second stage has an output signal power of at least about 19 dBm and a noise figure below about 6.5 dB.

18. The multi-stage optical fiber amplifier according to claim 15, wherein the output signal of the second stage has a wavelength range between about 1565 nm and 1620 nm.

19. The multi-stage optical fiber amplifier according to claim 15, wherein the first light source has a wavelength shorter than a wavelength of the output signal of the second stage.

20. A multi-stage optical fiber amplifier comprising:
 (i) a first gain stage having an input and an output for amplifying an optical signal;
 (ii) a pump source coupled to the first gain stage;
 (iii) a second gain stage coupled to the first gain stage and having an input and an output to further amplify the optical signal to a desired output signal power; and
 (iv) a second pump source including a rare earth doped laser and having an operating wavelength between 1500 nm and 1620 nm, said second pump source being coupled to the second gain stage.

* * * * *